J. E. Coutant's Improved Sled Brake
118202　　　　　　　　　　PATENTED AUG 22 1871
Fig: 1.
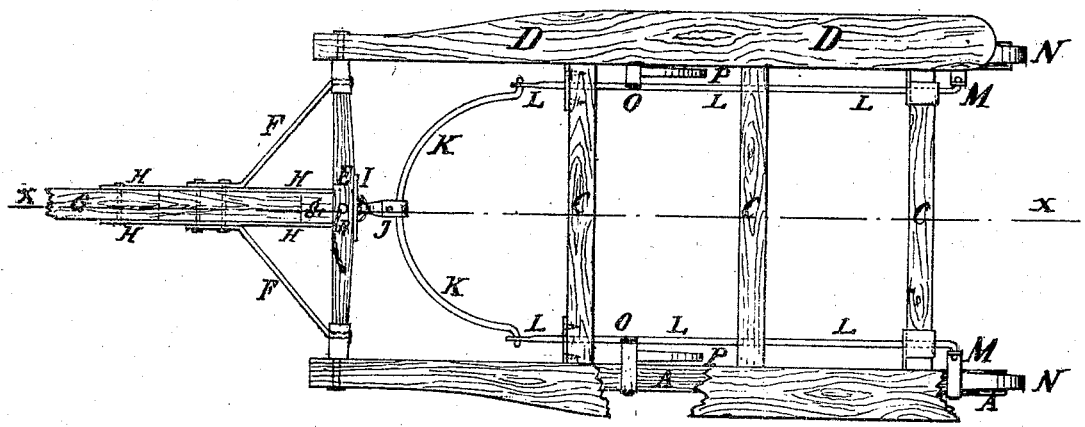
Fig: 2
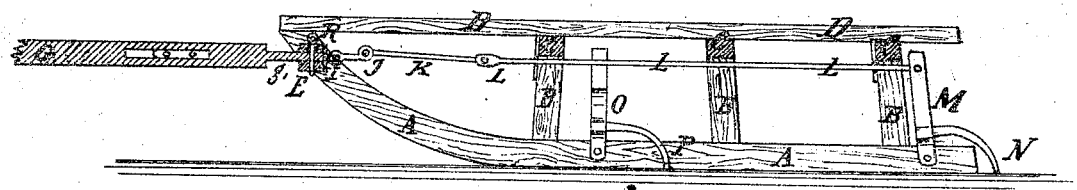
Witnesses:　　　　　　　　　　Inventor
Richard C. Plum.　　　　　　　John E. Coutant
Leske W. Rickard

UNITED STATES PATENT OFFICE.

JOHN E. COUTANT, OF RONDOUT, NEW YORK.

IMPROVEMENT IN SLED-BRAKES.

Specification forming part of Letters Patent No. 118,202, dated August 22, 1871.

*To all whom it may concern:*

Be it known that I, JOHN E. COUTANT, of Rondout, in the county of Ulster and State of New York, have invented a new and useful Improvement in Sled-Brake; and I do hereby declare that the following is a full, clear, and exact description thereof, which will enable others skilled in the art to make and use the same, reference being had to the accompanying drawing forming part of this specification.

Figure 1 is a top or plan view of a sled to which my improved brake has been attached, parts of one of the raves being taken away to show the construction. Fig. 2 is a vertical longitudinal section of the same taken through the line $x\,x$, Fig. 1.

Similar letters of reference indicate corresponding parts.

My invention has for its object to furnish an improved brake for attachment to bob and other sleds, which shall be simple in construction, effective in operation, and conveniently operated, being worked by the action of the horses in holding back the sled; and it consists in the construction and combination of the various parts of the brake, as hereinafter more fully described.

A are the runners, B are the knees, C are the beams, and D are the raves of the sled, about the construction of which parts there is nothing new. E is the tongue-roller, which is pivoted to the forward end of the sled in the ordinary manner. F are the tongue-braces, the rear ends of which are secured to the end parts of the roller E in the ordinary manner, and the forward ends of which are connected to the tongue G by bolts passing through a slot in the said tongue G, said slot being so arranged that when the draft is applied the rear bolts may rest against the rear end of the said slot. Upon the rear end of the tongue G is formed a long tenon, $g$, which passes through a mortise in the middle part of the roller E, said mortise being made of such a size that the tenon $g$ may work freely in it. The mortise in the roller E is made enough longer than the breadth of the tenon $g$ to receive the plates H, which are attached to the sides of the tongue G. The plates H are securely bolted to the tongue, and their forward ends extend beyond the slot in the tongue G, and are slotted to correspond with the said slot. The rear parts of the plate H extend along and correspond with the edges of the tenon $g$, and project beyond the end of said tenon to pass through a plate, I. Said plate is riveted or with nuts screwed upon their projected ends of the plates H, holding plate I firmly against the end of tenon $g$, as shown in Fig. 1; and upon the rear part of plate I is formed a coupling-stem or link, in which is attached a clip-strap or hinge, J, forming a joint. The rear part of said strap or hinge is firmly attached to the center part of a circular rod or brace, extending back right and left to the front part of the forward sled-beam C, and upon the outer parts of each end is formed a pivot that connects an eye formed in the forward end of rods L, as shown in Fig. 1. Said rods extend back, through guides secured to the sled-beam, to the rear part of the after sled-beam, where they are pivoted to the top part of a lever, M. The lower end of said lever is pivoted to the rear end of runner A, and near their lower ends are formed or attached dogs N. Said dogs are curved, to enable them to pass down over the ends of the runner A to come in contact with the road-bed. The rods L are slotted near the rear part of the front sled-beam C, through which slot the upper part of a lever, O, works. The lower end of said lever is pivoted to the runner A, and near their lower parts are attached or formed dogs P, the same being curved, as shown in Fig. 2.

By this construction, when draft is applied the dogs are raised and held away from the road-bed; but should the sled press forward upon the horses, or the horses press back upon the sled, the effect will be to force down the dogs into the road-bed, and thus retard or stop the sled.

R is a bolt, connected with the roller E by a short chain, and which, when the tongue is drawn forward, may be passed through a hole in the roller E and the tenon $g$ of the tongue G, as shown in Figs. 1 and 2. This enables the sled to be backed without applying the brakes.

The object of my improvement in sled-brakes of which I have Letters Patent, dated June 21, 1870, is to remove the cross-bar I, the same being, by heavy pressure, liable to spring and tremble. I remove this difficulty by substituting the plate I, combined with the clip-hinge J and circular rod or brace K.

By this construction I form a compact and center line, and secure firmness, simplicity, durability, and the free working of the sled-tongue in moving up and down.

Having thus described my improvement in sled-brake, I claim as new and desire to secure by Letters Patent—

The plate I, clip-hinge J, and circular rod or brace K, relatively constructed and connected with tenon $g$ and rods L, as shown and described, and for the purpose specified.

JOHN E. COUTANT.

Witnesses:
JOSIAH DUBOIS, Jr.,
ROBT. J. PENNY.